W. A. Fenn.
Blocking & Stretching Hats.
Nº 17083. Patented Apr. 21. 1857
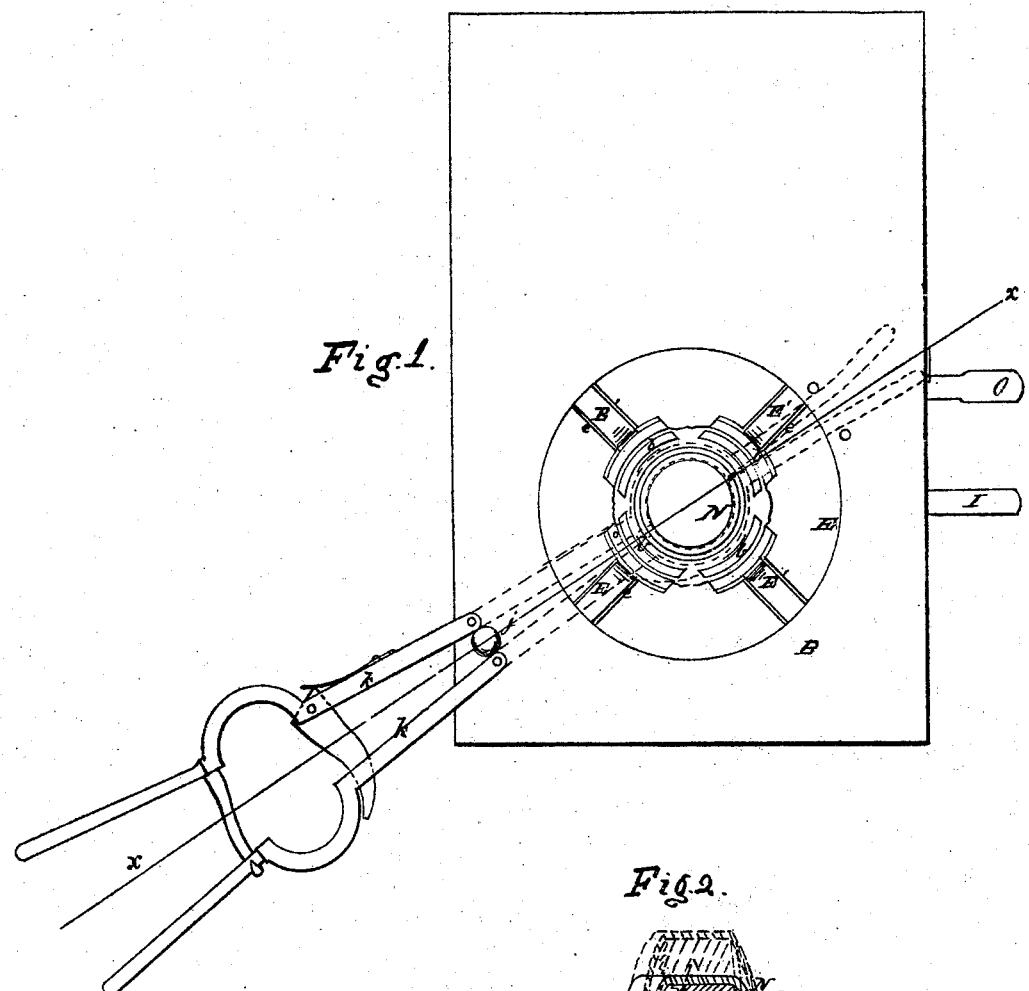
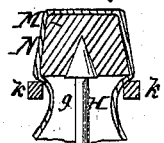
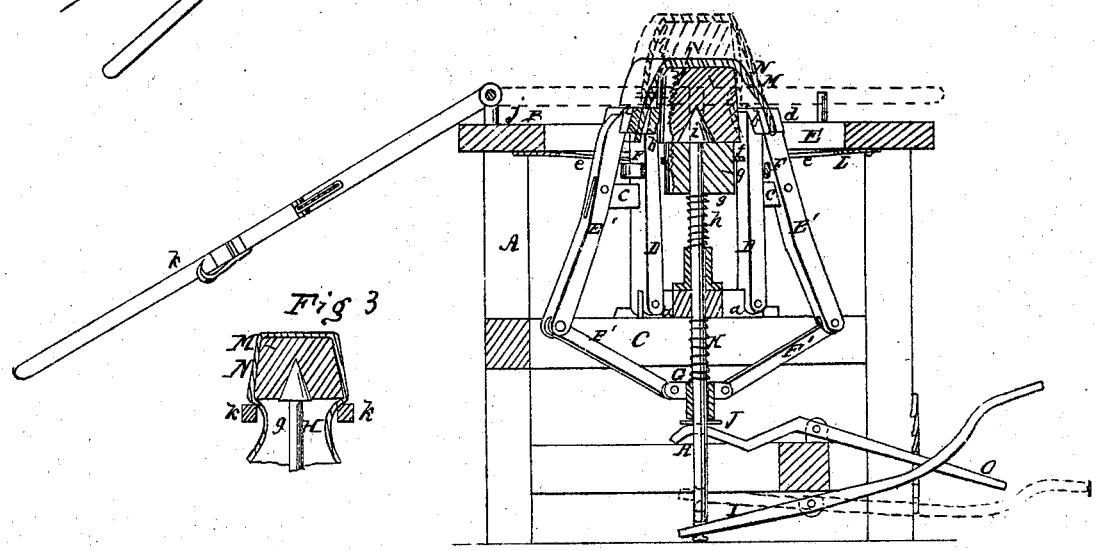

UNITED STATES PATENT OFFICE.

WILLIAM A. FENN, OF NEW MILFORD, CONNECTICUT.

MACHINE FOR BLOCKING HAT-BODIES.

Specification of Letters Patent No. 17,083, dated April 21, 1857.

*To all whom it may concern:*

Be it known that I, WILLIAM A. FENN, of New Milford, in the county of Litchfield and State of Connecticut, have invented a new and useful Implement or Device for Blocking Felted Hat-Bodies; and I do hereby declare that the following is a full, clear, and exact description of the same, reference being had to the annexed drawings, making a part of this specification, in which—

Figure 1 is a plan or top view of my improvement. Fig. 2 is a vertical section of ditto $x$ $x$, Fig. 1, showing the plane of section. Fig. 3 is a detached vertical section of the hat block with the body fitted over it.

Similar letters of reference indicate corresponding parts in the several figures.

This invention relates to a new and useful device for blocking felted hat bodies, whereby the hat bodies may be blocked in an expeditious and perfect manner.

To enable those skilled in the art to make and use my invention, I will proceed to describe its construction and the manner in which it is used.

A, represents a framing having a horizontal bed or platform B, on its upper part, and C, represents a horizontal bar which is secured in the framing A. This bar has four arms $a$, projecting from it at about its center, said arms being at right angles to each other. Two of the arms $a$, are shown in Fig. 2, the other two being at the opposite side of the bar C, and consequently hidden by it.

To the outer end of each arm $a$, the lower end of a vertical bar D, is pivoted. These bars D, extend up through a circular opening E, in the bed or platform A, and have each a jaw $b$, formed on them. The bars D, are encompassed by a band F, just below the jaws $b$. Each bar D, has a lug or ear $c$, projecting from it horizontally, and to each lug or ear a bar E′, is pivoted. The upper ends of the bars E″, are provided with jaws $d$, which are directly opposite the jaws $b$, on the bars D. To the lower end of each bar E′, a rod F′, is pivoted. The lower ends of the rods F′, are pivoted to a head G, which has a vertical spindle or arbor H, passing loosely through its center. The lower end of this spindle or arbor rests upon the inner end of a treadle I, and the head G, rests upon a spring plate J, the spindle or arbor passing through said plate. The arbor or spindle also passes through the center of the bar C, and a spiral spring K, is placed on said spindle or arbor, the spring being between the head G, and the bar C, and having a tendency to keep the head G, depressed and the jaws $b$, $d$, apart.

The underside of the bed or platform A, has a sheet metal plate L, secured to it, said plate covering the circular opening E. Radial slots $e$, are made through the plate L, to allow the bars D, E′, to pass through and a circular opening $f$, is made at the center of the plate to allow the upper end of the spindle or arbor H and a cylinder $g$, which is placed loosely on the spindle, to pass up and down through the plate L. The cylinder $g$, rests on a spiral spring $h$, on the spindle or arbor H, and a conical tip $i$, is placed on the upper end of the spindle or arbor.

At one corner of the bed or platform A, a pin $j$, is secured, and to the upper end of this pin two rods $k$, $k$, are pivoted. The center portions of these rods are curved, the curve of each rod being of semi-circular form and forming, when the rods are together, a ring somewhat smaller in diameter than the hat block M.

The hat body N, is taken as received from the fitting machine and its edge secured between the jaws $b$, $d$, of the bars D, E′. The jaws are kept together by pressing down the foot on the outer end of a treadle O, the inner end of which passes underneath the spring J. The hat block M, before the body is secured between the jaws $b$, $d$, is placed upon the conical tip $i$, and when the hat body is secured between the jaws $b$, $d$, the spindle or arbor H, is raised by depressing the outer end of the treadle I, and the hat block is forced up within the hat body, as shown in red, Fig. 2. The two rods $k$, $k$, are then brought over the hat block and body and passed down to a point below the block M, and the rods are closed, the curved portions serving as jaws and drawing the body snugly around the hat block, as shown clearly in Fig. 3. The cylinder $g$, in consequence of its resting upon the spring $h$, may be depressed when the curved portions of the rods $k$, $k$, clamp it, and the body may therefore be drawn sufficiently tight or snug around the hat block.

By the above device hat bodies may be blocked with the greatest facility and in a perfect manner. This machine will prove a valuable acquisition.

Having thus described my invention, what

I claim as new and desire to secure by Letters Patent, is:

The cylinder $g$, placed loosely on the spindle or arbor H, and resting on the spring $h$, in combination with the rods or jaws $k$, $k$, the above parts being arranged substantially as described, whereby the hat body may be stretched and adjusted snugly around the hat block.

WILLIAM A. FENN.

Witnesses:
 THEODORE BUCK,
 JOHN S. TUNILL.